United States Patent
Sawyers-Abbott (10) Patent No.: US 10,563,671 B2
(45) Date of Patent: Feb. 18, 2020

(54) METHOD AND APPARATUS FOR COOLING THRUST REVERSER SEAL

(71) Applicant: UNITED TECHNOLOGIES CORPORATION, Farmington, CT (US)

(72) Inventor: Nigel David Sawyers-Abbott, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 687 days.

(21) Appl. No.: 15/239,869

(22) Filed: Aug. 18, 2016

(65) Prior Publication Data

US 2018/0051715 A1 Feb. 22, 2018

(51) Int. Cl.
| | |
|---|---|
| F04D 29/58 | (2006.01) |
| F01D 25/12 | (2006.01) |
| F01D 11/00 | (2006.01) |
| B64D 27/10 | (2006.01) |
| F04D 29/08 | (2006.01) |
| B64D 33/02 | (2006.01) |

(52) U.S. Cl.
CPC ........... *F04D 29/582* (2013.01); *B64D 27/10* (2013.01); *F01D 11/005* (2013.01); *F01D 25/12* (2013.01); *F04D 29/083* (2013.01); *B64D 2033/0286* (2013.01); *F05D 2240/55* (2013.01); *F05D 2260/232* (2013.01); *Y02T 50/675* (2013.01)

(58) Field of Classification Search
CPC .......... F04D 29/582; F02K 1/62; F02K 1/625; F02K 1/70; F02K 1/72; F02K 1/805
See application file for complete search history.

(56) References Cited

U.S. PATENT DOCUMENTS

| | | | |
|---|---|---|---|
| 4,026,105 A | 5/1977 | James | |
| 5,197,807 A * | 3/1993 | Kuznar | F01D 25/164 277/645 |
| 5,927,647 A | 7/1999 | Masters et al. | |
| 6,261,063 B1 * | 7/2001 | Chikami | F01D 5/066 416/198 A |

(Continued)

FOREIGN PATENT DOCUMENTS

| | | |
|---|---|---|
| EP | 2540984 A2 | 1/2013 |
| EP | 2568150 | 3/2013 |

(Continued)

OTHER PUBLICATIONS

European Search Report for European Application No. 17186229.5, dated Dec. 22, 2017.

*Primary Examiner* — Gerald L Sung
*Assistant Examiner* — Colin J Paulauskas
(74) *Attorney, Agent, or Firm* — Carlson, Gaskey & Olds, P.C.

(57) ABSTRACT

A fan duct seal for a gas turbine engine has at least one seal body with a hollow center. A first opening is formed in the seal body that is in fluid communication with the hollow center. The first opening is configured to receive fan air flow. A second opening is formed in the seal body that is in fluid communication with the hollow center such that cooling flow enters the first opening, moves through the seal body and exits from the second opening. A fan duct for a gas turbine engine and a method of cooling a fan duct seal assembly are also disclosed.

26 Claims, 6 Drawing Sheets

(56) References Cited

U.S. PATENT DOCUMENTS

| | | | |
|---|---|---|---|
| 8,157,270 B2 | 4/2012 | Tsou et al. | |
| 2014/0003961 A1* | 1/2014 | Willey | F01D 5/187 416/97 R |
| 2014/0248128 A1 | 9/2014 | Budnick et al. | |
| 2015/0226130 A1 | 8/2015 | Salamon et al. | |
| 2015/0354384 A1 | 12/2015 | Budnick | |
| 2016/0032779 A1 | 2/2016 | Sawyers-Abbott | |
| 2016/0213877 A1* | 7/2016 | McAuley | A61M 16/06 |
| 2016/0370009 A1* | 12/2016 | Jin | F01D 9/023 |

FOREIGN PATENT DOCUMENTS

| | | |
|---|---|---|
| EP | 3187718 A1 | 7/2017 |
| WO | 2014051668 A1 | 4/2014 |

* cited by examiner

METHOD AND APPARATUS FOR COOLING THRUST REVERSER SEAL

BACKGROUND OF THE INVENTION

A gas turbine engine includes elastomeric seals that create a continuous close-out of an engine core compartment both to a pylon structure and a fan duct structure. Typically, these seals are comprised of multiple hollow seal bodies that are joined together to create a continuous seal. In some configurations, each seal body includes one small hole to help the seal stay inflated and resist blow-off pressure.

Aircraft turbofan engines are subjected to ever increasing temperature levels. Component materials associated with engine cores must be able to withstand these elevated temperatures. For example, current state of the art elastomeric seals that are used to close out the core compartment have a durability limit in a range of 500 degrees Fahrenheit. However, temperatures that may exceed this durability limit can be radiated toward the seals from a turbine exhaust case, or other sources of high temperature. Shielding is sometimes provided to prevent radiation from the turbine exhaust case toward the seals and thermal protection is added to pylon metallic structures to prevent the seals from exceeding the durability limit. Additionally, since these seals typically define the boundary of a Designated Fire Zone, the seals must also withstand temperatures up to 2000 degrees Fahrenheit for up to 15 minutes, which also requires components to block the flame or thermally protect the seal land. This increases complexity and cost.

SUMMARY OF THE INVENTION

In a featured embodiment, a fan duct seal for a gas turbine engine has at least one seal body with a hollow center. A first opening is formed in the seal body that is in fluid communication with the hollow center. The first opening is configured to receive fan air flow. A second opening is formed in the seal body that is in fluid communication with the hollow center such that cooling flow enters the first opening, moves through the seal body and exits from the second opening.

In another embodiment according to the previous embodiment, the seal body is configured to be compressed between an inner fixed structure and a pylon structure.

In another embodiment according to any of the previous embodiments, the inner fixed structure comprises one of a thrust reverser or fan duct inner fixed structure.

In another embodiment according to any of the previous embodiments, the pylon structure comprises a pylon seal depressor.

In another embodiment according to any of the previous embodiments, the first opening is configured to allow air into the hollow center.

In another embodiment according to any of the previous embodiments, the second opening is configured to cool the pylon seal depressor.

In another embodiment according to any of the previous embodiments, the air flowing from fore to aft induces a cooling effect on seal material of the seal body.

In another embodiment according to any of the previous embodiments, at least one seal body comprises a plurality of seal bodies joined together to form a continuous seal.

In another embodiment according to any of the previous embodiments, a joint connects one seal body to an adjacent seal body. The joint includes an extension portion on the one seal body and a receiver portion on the adjacent seal body that receives the extension portion, and further includes a plug inserted into the joint to increase stability. The plug includes a plug opening to allow airflow through the plug.

In another featured embodiment, a fan duct for a gas turbine engine has an inner fixed structure. A pylon structure is spaced from and faces the inner fixed structure. A seal body is compressed between the inner fixed structure and the pylon structure. The seal body has a hollow center. A first opening is formed in the seal body that is in fluid communication with the hollow center. The first opening is configured to receive fan air flow. A second opening is formed in the seal body that is in fluid communication with the hollow center such that cooling flow enters the first opening, moves through the seal body and exits from the second opening.

In another embodiment according to the previous embodiment, the pylon structure comprises a pylon seal depressor.

In another embodiment according to any of the previous embodiments, the second opening is configured to direct cooling airflow against the pylon seal depressor and through a seal inner cavity.

In another embodiment according to any of the previous embodiments, at least one seal body comprises a plurality of seal bodies joined together to form a continuous seal.

In another embodiment according to any of the previous embodiments, the inner fixed structure comprises one of a thrust reverser or fan duct inner fixed structure.

In another embodiment according to any of the previous embodiments, a joint connects one seal body to an adjacent seal body. The joint includes an extension portion on the one seal body and a receiver portion on the adjacent seal body that receives the extension portion.

In another embodiment according to any of the previous embodiments, a plug is inserted into the joint to increase stability. The plug includes a plug opening to allow airflow through the plug.

In another featured embodiment, a method of cooling a fan duct seal assembly includes providing at least one seal body having a hollow center. A first opening is formed in the seal body that is in fluid communication with the hollow center. A second opening is formed in the seal body that is in fluid communication with the hollow center. A fan receives air flow through the first opening such that cooling flow moves through the seal body and exits from the second opening.

In another embodiment according to the previous embodiment, the seal body is compressed between a thrust reverser or fan duct inner fixed structure and a pylon structure.

In another embodiment according to any of the previous embodiments, at least one seal body comprises a plurality of seal bodies and including joining the plurality of seal bodies together to form a continuous seal.

In another embodiment according to any of the previous embodiments, a joint is formed to connect one seal body to an adjacent seal body. The joint includes an extension portion on the one seal body and a receiver portion on the adjacent seal body that receives the extension portion. A sealant adhesive is applied at each joint location.

The foregoing features and elements may be combined in any combination without exclusivity, unless expressly indicated otherwise.

These and other features may be best understood from the following drawings and specification.

DETAILED DESCRIPTION

Figure 1:
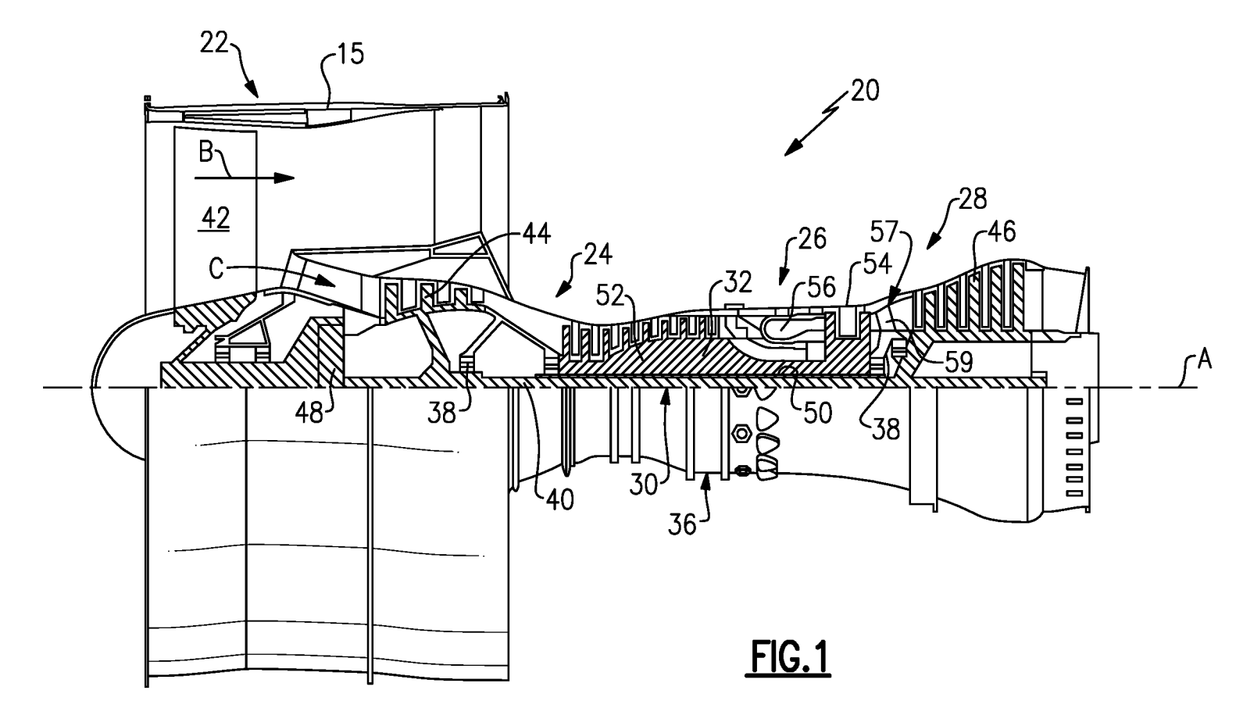
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2A:
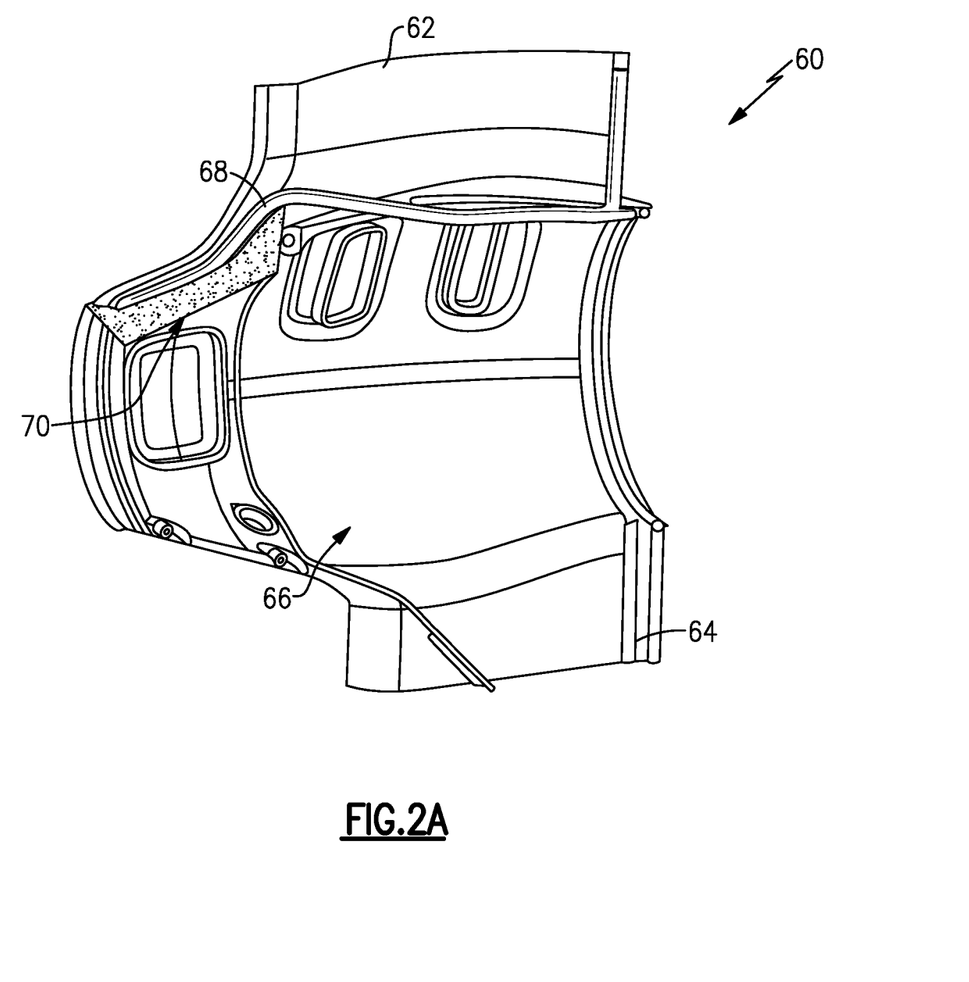
FIG. 2A is a perspective view of a hot zone area for a thrust reverser seal assembly in a left hand core cowl.
Figure 2B:
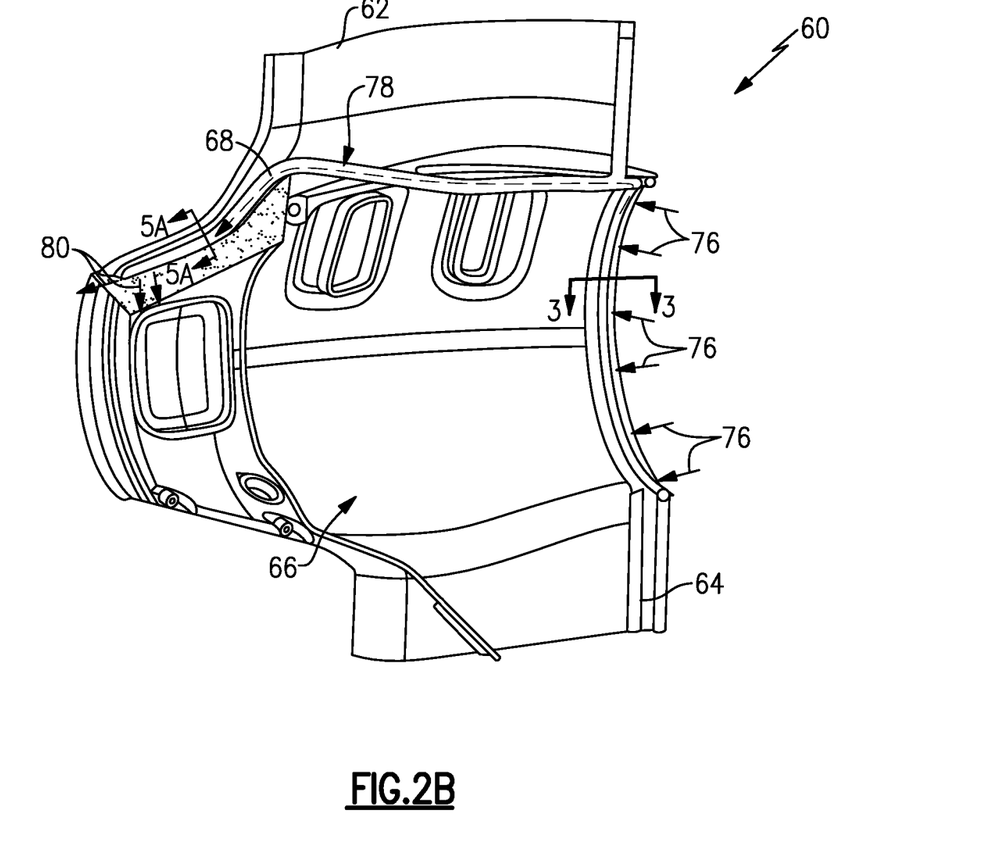
FIG. 2B is similar to FIG. 2A but shows cooling airflow through the seal assembly.

FIGS. 2A-2B show a left hand core cowl 60 with an upper bifurcation 62 and a lower bifurcation 64 extending from opposite sides of the core cowl 60. The core cowl 60 defines a portion of a core compartment 66, with a remaining portion being formed from a right hand core cowl (not shown) that is similarly configured to the left hand core cowl 60. An elastomeric seal assembly 68 creates a continuous close-out of the core compartment 66 to both a fan duct and pylon.

During engine operation, temperatures in a region 70 shown in FIG. 2A can often exceed 500 degrees Fahrenheit. The seal assembly 68 comprises a continuous elastomeric seal that includes a portion that is used to close an upper end of a fire zone and isolate the pylon. This seal portion is close to the hot region 70 of the core compartment 66. While only a portion of the seal assembly 68 is shown in FIG. 2A, it should be understood that the seal assembly 68 runs all the way around an inner fixed structure (IFS) 74 (FIG. 3) of the engine and encases the engine core.

FIG. 2B shows a cooling airflow path for the seal assembly 68. Arrows 76 indicate pressurized fan air flowing into the seal assembly 68. The cooling air flows along the seal assembly, as indicated at 78, to a low pressure region at a back end of the seal assembly 68. Cooler air then flows out of the seal assembly 68, as indicated at 80, to keep the seal assembly and associated seal land cool during engine operation.

Figure 3:
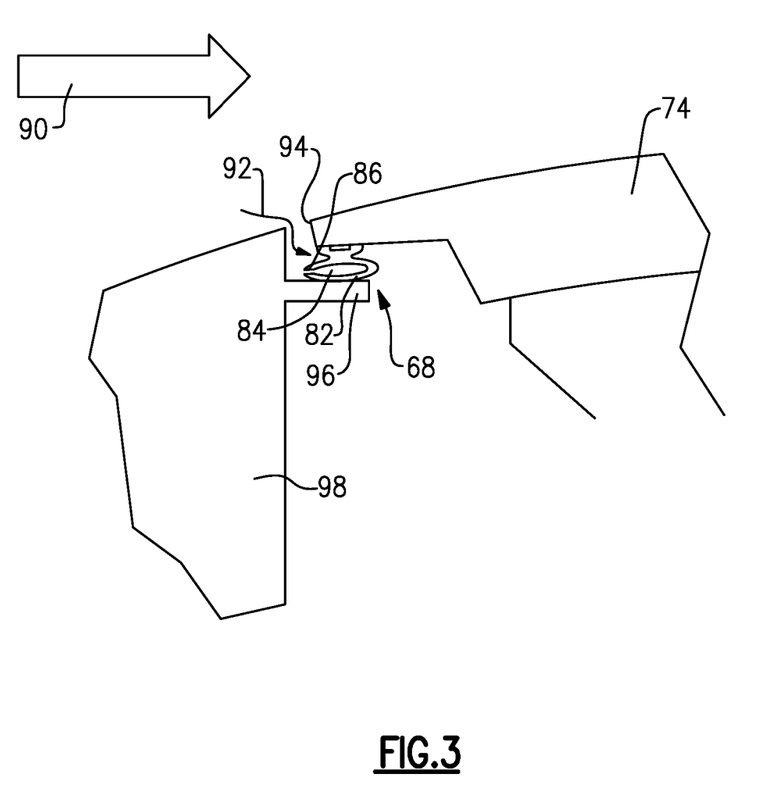
FIG. 3 is a schematic section view of the seal assembly as identified in FIG. 2B.

As shown schematically in FIG. 3, the seal assembly 68 includes a seal body 82 that has a hollow center 84. A first opening 86 is formed in the seal body 82. The first opening 86 is configured to receive fan air flow 90 and is in fluid communication with the hollow center 84 which receives cool high pressure air 92 at an IFS leading edge 94.

Figure 4:
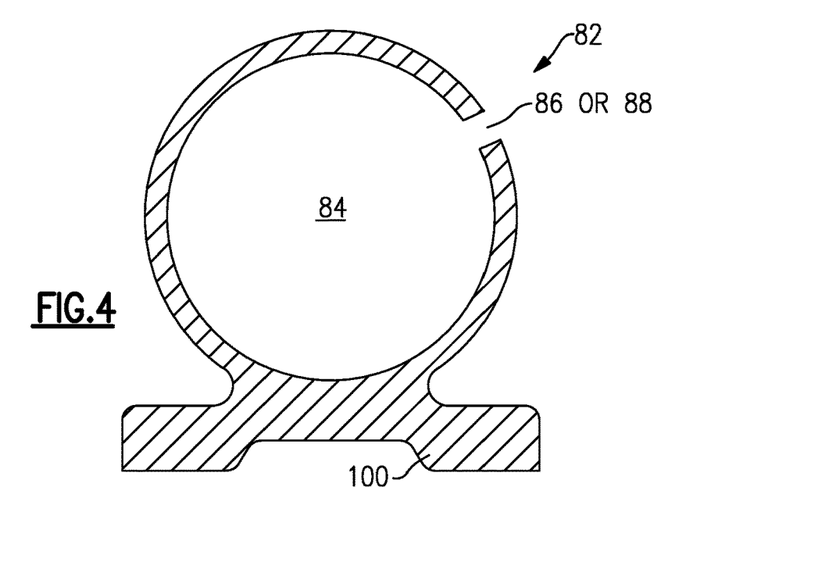
FIG. 4 is a section view of one example of a seal body.

The seal body 82 has a base 100 at the IFS 74 and is compressed between the leading edge 94 of the IFS 74 and a seal land extension 96 formed on an adjacent engine frame structure 98. FIG. 4 shows another example where the first hole 86' can be formed in the seal body 82.

Figure 5A:
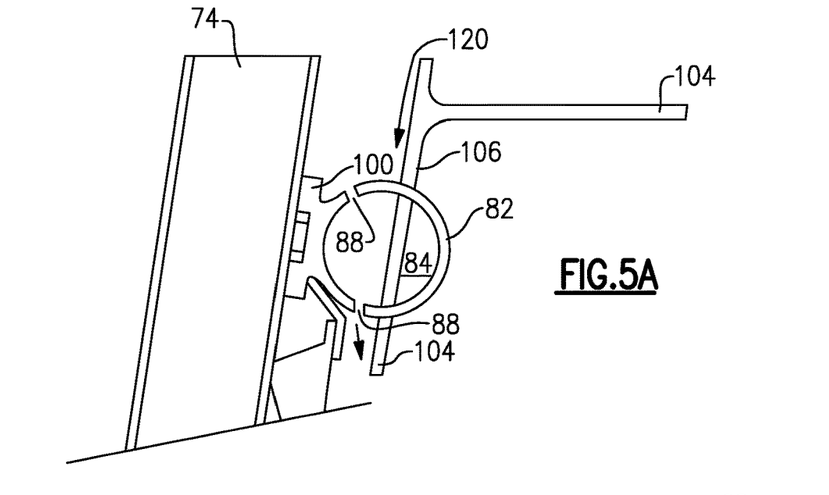
FIG. 5A is a side view of another example of a seal body in an uncompressed state between an inner fixed structure and a pylon structure.
Figure 5B:
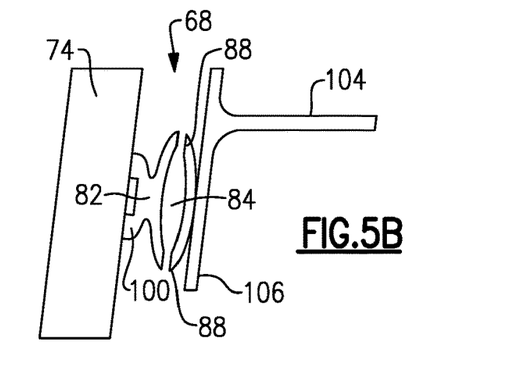
FIG. 5B is similar to FIG. 5A but showing the seal in a compressed state.

FIGS. 5A and 5B show an example of the seal body 82 being located between a thrust reverser IFS 74 (base 100 of seal body at IFS 74) and a pylon structure 104 (bulb of seal body 82 at pylon structure 104). The pylon structure 104 includes a pylon seal depressor 106 that extends generally parallel to an outer surface of the thrust reverser IFS 74. FIG. 5A shows what the seal body 82 would look like in an uncompressed state and FIG. 5B shows the compressed state of the seal body 82.

The pylon seal depressor 106, which is typically comprised of a steel material, is located in an environment that can exceed 500 degrees Fahrenheit. Cooling flow 92 flows into the first opening 86, through the hollow center 84, and exits a second opening 88 to cool both the seal material and the pylon seal depressor 106 as indicated at 120. Thus, the second hole 88 allows for cooling airflow through the seal body 82 itself, as well as cooling the pylon seal depressor 106, to facilitate maintaining the seal body material at temperatures of 500 degrees Fahrenheit or less.

Figure 6:
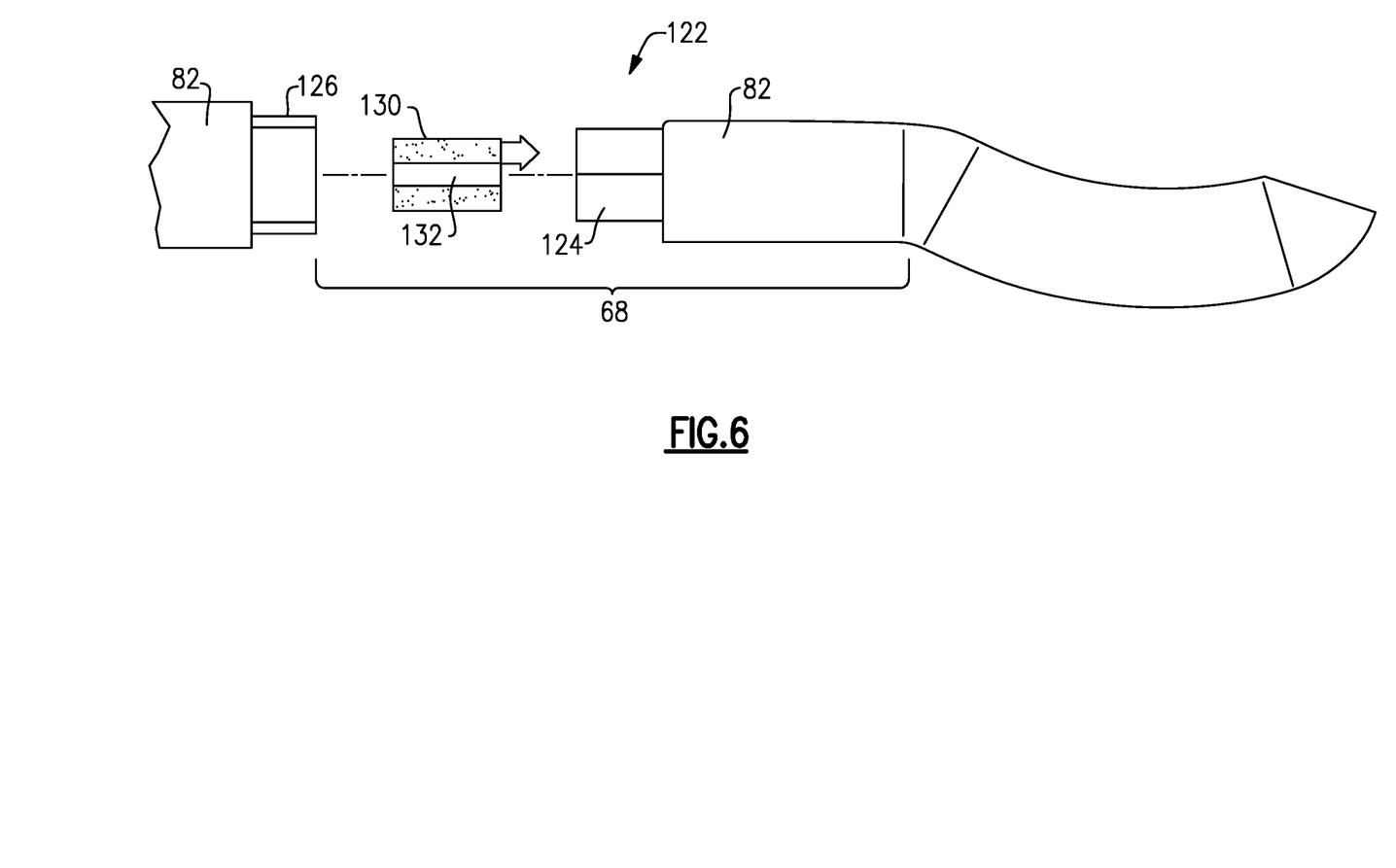
FIG. 6 is a side view of one example of a joint between two seal bodies.

As shown in FIG. 6, the seal assembly 68 is comprised of a plurality of seal bodies 82 that are joined together to form a continuous seal that extends around the IFS as shown in FIGS. 2A-2B. A joint 122 is used to connect one seal body 82 to an adjacent seal body 82. The joint 122 comprises an extension portion 124 on the one seal body 82 and a receiver portion 126 on the adjacent seal body 82. The receiver portion 126 slides over the extension portion 124 to couple the seal bodies 82 together. Further, in one example, room temperature vulcanization (RTV) is used at the joint 122 as a sealant/adhesive.

A plug 130 is frequently inserted into the joint 122 to provide structural stability. In one example, the plug 130 is formed from a foam material. The plug 130 would therefore include a tube or a plug opening 132 to allow airflow through the plug 130 along the total seal system. The tube or opening 132 in the foam allows airflow through the plug 130 and prevents the joint 122 from being crushed when the seal is compressed.

As such, the subject seal assembly 68 comprises hollow bulb-type seal assembly that includes a series of holes or openings formed in the individual seal bodies 82 on the leading edge of the IFS and exhaust cooling air in the seal segment that runs directly above the high temperature zone 70. This seal assembly 68 is compressed against the metallic pylon structure. The air temperature at the IFS leading edge will typically be below 250 degrees Fahrenheit, while the air temperature and metallic temperature around the high temperature zone 70 can frequently exceed 500 degrees Fahrenheit.

The subject seal assembly 68 uses the cooler air flowing from the front end to the aft end to keep the elastomer material of the seal assembly cool, and additionally exhausts the cool air onto the seal land of the pylon structure to keep the entire compression surface below the temperature durability limit of the elastomer. By using the subject seal assembly metallic shielding, which is usually steel or titanium, can be avoided as well as the use of thermal blankets on the pylon structure. Further, there is improved seal durability as the material of the seal is maintained within the durability limit. Additionally, the seal could be used to complement existing ventilation scoops in the fan duct to provide improved ventilation in the core compartment, and can be used to connect to other ducts/tubes to direct airflow where needed for component cooling.

Although embodiments of this invention has been disclosed, a worker of ordinary skill in this art would recognize that certain modifications would come within the scope of this invention. For that reason, the following claims should be studied to determine the true scope and content of this invention.

The invention claimed is:

1. A fan duct seal for a gas turbine engine comprising:
   an inner fixed structure or a pylon structure for the gas turbine engine;
   at least one seal body associated with the inner fixed structure or the pylon structure, the at least one seal body comprising a bulb having a hollow center defining a cooling air flow within the at least one seal body and along a length of the at least one seal body;
   a first opening formed in the at least one seal body that is in fluid communication with the hollow center, wherein the first opening is configured to receive fan air flow; and
   a second opening formed in the at least one seal body that is in fluid communication with the hollow center such that cooling flow enters the first opening, moves through the at least one seal body and exits from the second opening.

2. The seal according to claim 1, wherein the at least one seal body has a base at the inner fixed structure and wherein the bulb contacts the pylon structure.

3. The seal according to claim 2, wherein the inner fixed structure comprises one of a thrust reverser or fan duct inner fixed structure.

4. The seal according to claim 2, wherein the pylon structure comprises a pylon seal depressor.

5. The seal according to claim 4, wherein the first opening directs air into the hollow center.

6. The seal according to claim 4, wherein the second opening is configured to cool the pylon seal depressor.

7. The seal according to claim 4, wherein air flowing along the cooling airflow path, within the at least one seal body, and along the length of the at least one seal body from fore to aft, induces a cooling effect on seal material of the at least one seal body.

8. The seal according to claim 1, wherein the at least one seal body comprises a plurality of seal bodies joined together to form a continuous seal.

9. The seal according to claim 8, including a joint to connect one seal body to an adjacent seal body, wherein the joint includes an extension portion on the one seal body and a receiver portion on the adjacent seal body that receives the extension portion, and further including a plug inserted into the joint to increase stability, and wherein the plug includes a plug opening to allow airflow through the plug.

10. The seal according to claim 8, wherein the continuous seal extends completely around the inner fixed structure and encases an engine core.

11. The seal according to claim 1, including a seal land structure that engages the at least one seal body, and wherein the at least one seal body comprises a continuous seal that creates a continuous close-out of a core compartment to both a fan duct and a pylon, and wherein the cooling airflow passage within the at least one seal body extends along the length of the at least one seal body to direct cooler air flowing from a front end to an aft end to keep an elastomer material of the at least one seal body cool, and additionally exhausts the cool air via the second opening onto the seal land.

12. A fan duct for a gas turbine engine comprising:
an inner fixed structure;
a pylon structure spaced from and facing the inner fixed structure; and
a seal body compressed between the inner fixed structure and the pylon structure, the seal body having
a hollow center,
a first opening formed in the seal body that is in fluid communication with the hollow center, wherein the first opening is configured to receive fan air flow, and
a second opening formed in the seal body that is in fluid communication with the hollow center such that cooling flow enters the first opening, moves through the seal body and exits from the second opening.

13. The fan duct according to claim 12, wherein the pylon structure comprises a pylon seal depressor.

14. The fan duct according to claim 13, wherein the second opening is configured to direct cooling airflow against the pylon seal depressor and through a seal inner cavity.

15. The fan duct according to claim 12, wherein the body comprises a plurality of seal bodies joined together to form a continuous seal.

16. The fan duct according to claim 15, including a joint to connect one seal body to an adjacent seal body, wherein the joint includes an extension portion on the one seal body and a receiver portion on the adjacent seal body that receives the extension portion.

17. The fan duct according to claim 16, including a plug inserted into the joint to increase stability, and wherein the plug includes a plug opening to allow airflow through the plug.

18. The fan duct according to claim 15, wherein the continuous seal extends completely around the inner fixed structure of the gas turbine engine and encases an engine core.

19. The fan duct according to claim 12, wherein the inner fixed structure comprises one of a thrust reverser or fan duct inner fixed structure.

20. The fan duct according to claim 12, wherein the seal body comprises a continuous seal that creates a continuous close-out of a core compartment to both the inner fixed structure and the pylon structure.

21. A method of cooling a fan duct seal assembly comprising:
providing at least one seal body having a hollow center;
forming a first opening in the at least one seal body that is in fluid communication with the hollow center;
forming a second opening in the at least one seal body that is in fluid communication with the hollow center; and
receiving fan air flow through the first opening such that cooling flow moves through the at least one body and exits from the second opening.

22. The method according to claim 21, including compressing the at least one seal body between a thrust reverser or fan duct inner fixed structure and a pylon structure.

23. The method according to claim 21, wherein the at least one seal body comprises a plurality of seal bodies and including joining the plurality of seal bodies together to form a continuous seal.

24. The method according to claim 23, including forming a joint to connect one seal body to an adjacent seal body, wherein the joint includes an extension portion on the one seal body and a receiver portion on the adjacent seal body that receives the extension portion, and including applying a sealant adhesive at the joint.

25. The method according to claim 23, wherein the continuous seal extends completely around an inner fixed structure of an engine and encases an engine core.

26. The method according to claim 21, wherein the at least one seal body comprises a continuous seal that creates a continuous close-out of a core compartment to both a fan duct and pylon.

* * * * *